(12) United States Patent
Langlois et al.

(10) Patent No.: US 8,154,148 B2
(45) Date of Patent: Apr. 10, 2012

(54) DEVICE AND METHOD FOR EMERGENCY ELECTRICITY SUPPLY ON BOARD AN AIRCRAFT

(75) Inventors: Olivier Langlois, Colomiers (FR); Etienne Foch, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 752 days.

(21) Appl. No.: 12/294,435

(22) PCT Filed: Mar. 13, 2007

(86) PCT No.: PCT/EP2007/052325
§ 371 (c)(1),
(2), (4) Date: Sep. 25, 2008

(87) PCT Pub. No.: WO2007/115882
PCT Pub. Date: Oct. 18, 2007

(65) Prior Publication Data
US 2011/0198918 A1 Aug. 18, 2011

(30) Foreign Application Priority Data
Apr. 11, 2006 (FR) ...................................... 06 51322

(51) Int. Cl.
*B60L 1/00* (2006.01)
*B60L 3/00* (2006.01)
*H02G 3/00* (2006.01)

(52) U.S. Cl. ...................................................... 307/9.1
(58) Field of Classification Search ............... 307/9.1, 307/23, 68; 244/53 R, 58, 60
See application file for complete search history.

(56) References Cited

U.S. PATENT DOCUMENTS

| 5,899,411 A | 5/1999 | Latos et al. | |
| 2005/0206351 A1* | 9/2005 | Wingett et al. | 322/44 |
| 2007/0284480 A1* | 12/2007 | Atkey et al. | 244/135 R |

FOREIGN PATENT DOCUMENTS

| DE | 32 20 782 | 12/1983 |
| EP | 0 271 744 | 6/1988 |

OTHER PUBLICATIONS

Jean-Philippe Poirrier: Pentadyne News and Events, Retrieved from the Internet: <URL: http://www.pentadyne.com/NEWS2006Feb16.htm> (2006) XP-002412024.

* cited by examiner

*Primary Examiner* — Jared Fureman
*Assistant Examiner* — Carlos Amaya
(74) *Attorney, Agent, or Firm* — Oblon, Spivak, McClelland, Maier & Neustadt, L.L.P.

(57) ABSTRACT

A device and a method for emergency electricity supply on board an aircraft, able to supply a part of the aircraft's electrical power circuit. The device includes a synchronous machine with separate excitation, associated with a flywheel, and an auxiliary device to set the flywheel in rotation and to maintain rotation of the flywheel.

10 Claims, 5 Drawing Sheets

DEVICE AND METHOD FOR EMERGENCY ELECTRICITY SUPPLY ON BOARD AN AIRCRAFT

TECHNICAL AREA

The invention concerns a device and a method for emergency electricity supply on board an aircraft, for example an <<all-electric>> aircraft.

STATE OF THE PRIOR ART

In the remainder of the description consideration is given by way of example to an aircraft of airplane type.

One source of emergency electrical power frequently used on a <<more electric aircraft>> is a Ram Air Turbine—RAT, which drives an electric generator via a step-up gear.

In emergency situations on board an airplane, said ram air turbine can be used to generate sufficient electric power to enable this airplane to fly for a sufficient length of time and to land.

A ram air turbine comprises a propeller which is actuated by air at high speed circulating against the airplane. The propeller, which therefore rotates, drives an electric generator which provides the necessary emergency power to supply the <<essential>> part of the electrical power circuit to enable the airplane's critical systems e.g. the flight commands and key airplane circuits to continue to function. Under normal flight conditions, the assembly is retracted and housed in the fuselage or a wing of the airplane.

On a so-called <<more electric>> airplane, the flight commands used to manoeuvre the airplane are moved by hydraulic and electric actuators. An exemplary architecture of corresponding hydraulic and electric circuits is illustrated in FIG. 1, under normal operating conditions, the ram air turbine not being active.

In this figure, a first engine M1 of the airplane mechanically drives a primary electricity generator GEN1 and a hydraulic pump PH1, and a second engine M2 of the airplane mechanically drives a second electricity generator GEN2 and a second hydraulic pump PH2.

Each electricity generator GEN1 or GEN2 is connected to a three-phase, electric distribution bus bar, 10 and 11 respectively, each thereof being connected to an <<essential>> three-phase, electric distribution bus bar 12 and 13. Also, each hydraulic pump PH1 or PH2 is used to feed hydraulic actuators 20 or 21.

The <<essential>> part 15 of the electrical power circuit, in addition to these bus bars 12 and 13, comprises electric actuators 16 and 17, e.g. the electric actuators for flight commands, and other critical loads 18.

A ram air turbine RAT can be connected to these essential, three-phase distribution bus bars 12 and 13.

In the event of total failure, or loss, of power from the engines M1 and M2, only the electric actuators 16 and 17, and the other critical loads 18 are used. The emergency power supply, which in this case is the ram air turbine RAT, is electric. Under emergency functioning, the electricity generator of the ram air turbine RAT is able to supply the <<essential>> part 15 of the electrical power circuit, for example with three-phase alternating current 115/200 Volts AC.

After the <<more electric>> airplane, an <<all-electric>> airplane is envisioned. In this type of airplane, the flight commands are actuated by electric actuators only. One example of corresponding architecture is illustrated FIG. 2 under normal functioning conditions, the ram air turbine not being active. The parts of this FIG. 2, which were already illustrated FIG. 1, maintain identical references.

In this figure, two new electricity generators GEN3 and GEN4 are respectively connected to three-phase, electric distribution bus bars 25 and 26, to which electric actuators 27 and 28 are connected.

The generation of emergency electric power can be produced in 115/200 Volts AC for example or 230/400 Volts AC. The <<essential>> part 15 of the electrical power circuit is designed for these same voltages in order to supply <<essential>> power-consuming equipment.

In the event of total loss of power from the engines, a technical problem arises related to the transitory period occurring between this total loss and the effective entry into service of the emergency power supply.

On a <<more electric>> airplane of mixed architecture such as illustrated FIG. 1, with both electric and hydraulic actuators, the production of energy during this transitory period is naturally taken over by the hydraulic pumps on account of the inertia of the engines. On the other hand, the generation of electricity is very rapidly halted after engine loss owing to electric frequency constraints which prevent use of the electricity generators at low rotating speeds.

FIG. 3 illustrates the consequences of engine loss on electricity generators GEN1 and GEN2 and on normal hydraulic pumps PH1 and PH3. It gives the time curve of N/Nmax, N being the engine rotating speed, in which:

P: normal engine functioning range, t1: engine loss at speed N equal to the maximum speed Nmax, t2: engine loss at speed N=50% of Nmax, and loss of electricity generation (generators GEN1 and GEN2), Δt: transitory period (t2→t3), t4: loss of hydraulic generation (hydraulic pumps PH1 and PH2), Therefore, if the initial engine speed is 50% of the maximum speed, electricity generation (GEN1, GEN2) is instantly lost after loss from the engines (M1 and M2). On the other hand, hydraulic generation (PH1, PH2) is ensured for a few seconds (up until time t4).

Sufficient power and hydraulic energy can therefore be provided during the start-up of the emergency supply (ram air turbine RAT), enabling guaranteed airplane manoeuvrability.

On an <<all-electric>> airplane, the absence of hydraulic energy therefore means that coverage of the transitory period Δt can no longer be ensured just after engine loss, and hence airplane manoeuvrability cannot be ensured.

Additionally, it is to be noted that a second transitory period is observed on landing of the airplane. A ram air turbine RAT is ineffective at low aircraft speed, after landing. Yet braking of the airplane's wheels requires substantial power and energy.

On a <<more electric>> airplane having a hydraulic circuit, emergency braking is achieved by means of hydraulic accumulators which can feed the brakes by releasing their fluid at a given pressure. On the other hand, in an <<all-electric>> airplane, the energy required for braking must therefore be provided by an electricity source other than the ram air turbine.

The object of the invention is to propose a device and method to supply emergency power allowing coverage of these transitory periods.

DESCRIPTION OF THE INVENTION

The invention concerns a device for emergency electricity supply on board an aircraft, able to supply the <<essential>> part of the aircraft's electrical power circuit, characterized in that it comprises a first synchronous machine with separate excitation associated with an inertia flywheel, and an auxiliary device for setting the flywheel in rotation and maintaining its rotation.

In one advantageous embodiment, the device of the invention also comprises a second synchronous machine with separate excitation, associated with a ram air turbine.

Advantageously the first synchronous machine is connected:
- to an auxiliary device which itself is connected to an <<essential>> bus bar via a first three-phase contactor,
- to this bus bar via a second three-phase contactor,
- to the second synchronous machine, via this second three-phase contactor and a third three-phase contactor.

Advantageously, the auxiliary device comprises two static converters. The first converter is a three-phase rectifier able to obtain direct voltage. The second converter is a three-phase inverter, which allows self-piloting of the first synchronous machine.

The invention also concerns a method to provide emergency electric power on board an aircraft, characterized in that a first synchronous machine with separate excitation is used, associated with a flywheel to supply the <<essential>> part of the aircraft's electricity circuit in the event of total failure of electricity generation, and in that the flywheel is set in rotation and maintained in rotation by means of an auxiliary device.

Advantageously, a second machine with separate excitation is used, associated with a ram air turbine. Advantageously, in the event of total failure of electricity generation, the flywheel is instantly coupled to the essential part of the electricity circuit and, after the few seconds needed for deployment and setting in rotation of the ram air turbine, the flywheel is uncoupled from the circuit. The flywheel is recharged using the <<essential>> part of the electric power circuit, via the auxiliary device.

Advantageously, on landing of the aircraft, when the ram air turbine becomes inactive, the fly wheel is coupled to the circuit so as to provide the necessary power for braking of the aircraft.

The invention also concerns an aircraft comprising a device such as described above.

Advantageously, the aircraft is an <<all-electric>> airplane.

The device of the invention brings numerous advantages:

It can ensure coverage of the transitory periods: the providing of a storage device of flywheel type can ensure availability of the electrical power circuit during transitory periods of inactivity of the electric power source e.g. of the ram air turbine. This function is particularly useful during the moments following after total engine loss and on aircraft landing. Said advantage applies to any airplane having an emergency electric power source.

It can be directly coupled to the airplane's three-phase AC network: the flywheel associated with a three-phase electric machine allows direct coupling to the airplane's three-phase circuit, without the use of static converters. This is of particular interest insofar as significant experience is acquired with respect to alternating current in aeronautics. The absence of a static converter provides for improved sturdiness with the use of simple systems only. Said advantage applies to an airplane having at least part of the emergency electric power circuit in AC.

DETAILED DESCRIPTION OF PARTICULAR EMBODIMENTS

Figure 1:
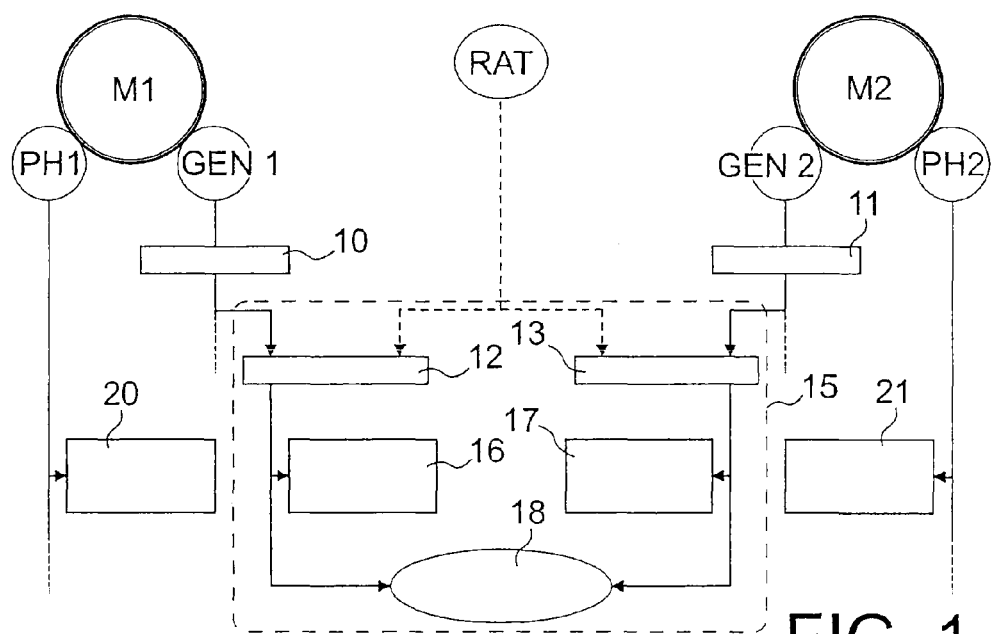
FIG. 1 illustrates the simplified architecture of an electrical power system in a <<more electric>> airplane having both electric and hydraulic actuators.
Figure 2:
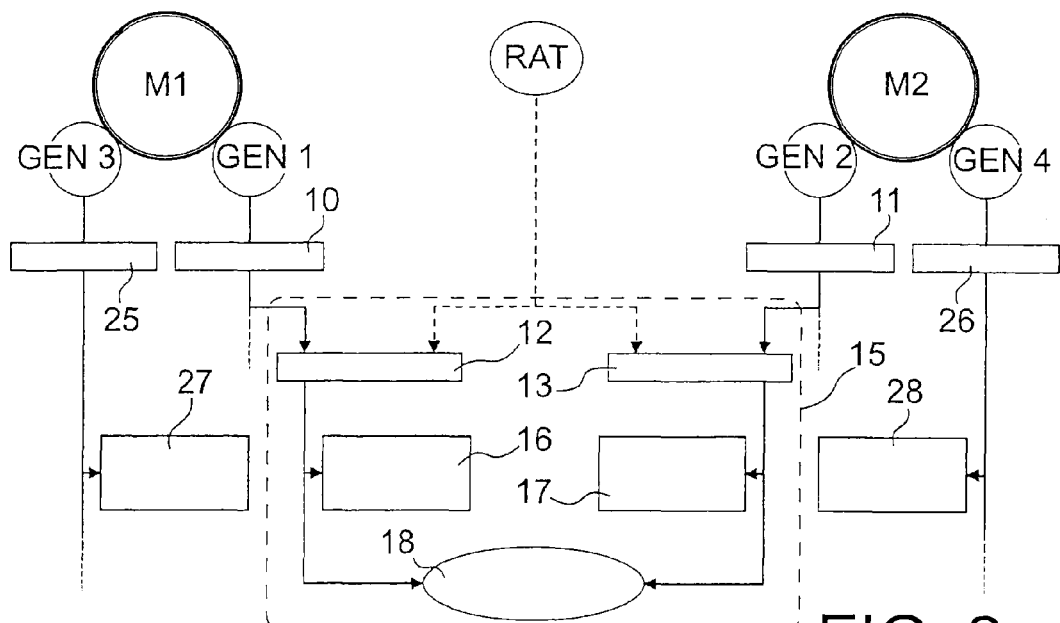
FIG. 2 illustrates the simplified architecture of the electrical power system of an <<all-electric>> airplane, with no hydraulic energy.
Figure 3:
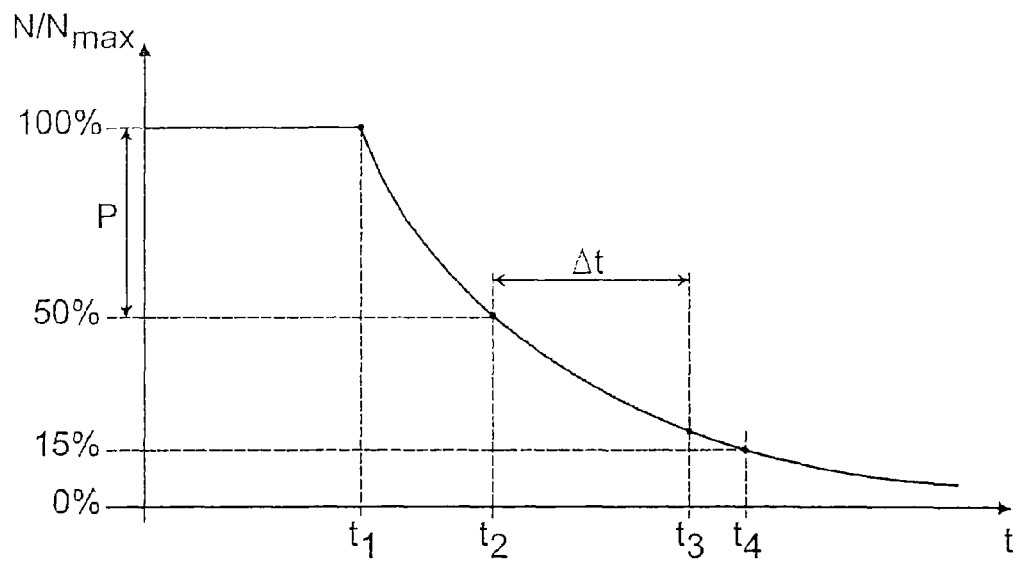
FIG. 3 illustrates a time curve of N/Nmax in relation to time t, N being the engine rotating speed, in the event of engine losses in an architecture of the type illustrated FIG. 1.
Figure 4:
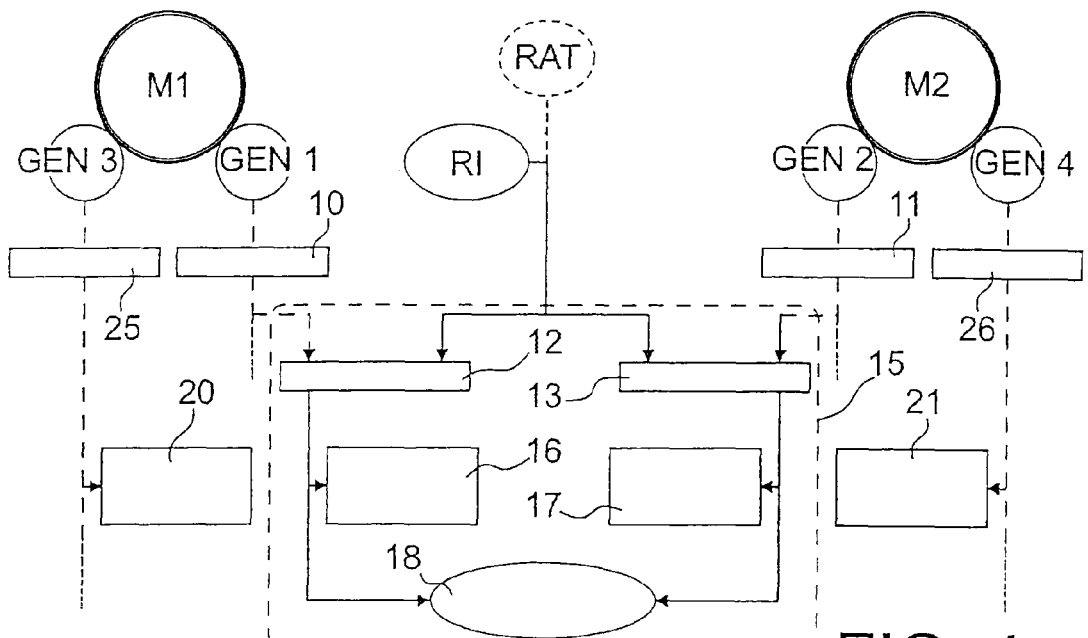
FIG. 4 illustrates the device for emergency electric power supply according to the invention.

As illustrated FIG. 4, the device for emergency electric power supply in the invention comprises a storage device e.g. a flywheel RI, optionally associated with a ram air turbine RAT, the other parts of this figure, already illustrated FIG. 2, maintaining the same references.

FIG. 4 illustrates a simplified architecture of an electrical power system in an <<all-electric>> airplane, i.e. with no hydraulic energy, under emergency functioning during the transitory periods in which the ram air turbine RAT is not in service. The flywheel RI (or kinetic accumulator), supplies the <<essential>> part 15 of the electrical power system.

This flywheel RI, which is coupled to a rotating electric machine, has reversible power: it can transform mechanical energy into electrical energy and vice-versa. It can therefore be used to store electrical energy in mechanical form outside the transitory periods, and is subsequently able to release the mechanically stored energy towards the electrical power system during any transitory periods.

The use of said electric machine offers the possibility to couple the flywheel directly to the three-phase AC circuit of the airplane, for example 115/200 Volts AC or 230/400 Volts AC, which is not the case with numerous other existing systems for electrochemical storage such as storage batteries and super-capacitors, which are solely used with DC current. Said coupling avoids having to install a static converter requiring power electronics. This results in savings in terms of weight, cost and more especially reliability.

Advantageously this electric machine can be a synchronous machine with separate excitation, allowing control over circuit voltages during transitory periods, by acting on its excitation. In said machine, a primary machine is associated with an auxiliary machine, as is often the case for electric generators in aeronautics, excitation of the primary machine being obtained indirectly by excitation of the auxiliary machine.

However, said synchronous machine with separate excitation cannot be permanently coupled to the electric circuit, since this would create substantial voltage disturbance. The slightest variation in frequency, even with a fixed 400 Hz circuit, would impose a variation in rotating speed of the flywheel. Its high inertia, opposing the imposed speed variation, would then lead to a strong variation in mechanical torque, and therefore to high power peaks which would disturb the electrical circuit.

This synchronous machine with separate excitation is therefore only coupled to the electrical power circuit at the time of a transitory period, whether the circuit is supplied by electric generators, under normal operating conditions, or by the ram air turbine under emergency conditions.

An auxiliary device is used to place the flywheel in rotation and to maintain its rotation.

Setting in rotation of the flywheel, used to store kinetic energy therein, takes place on start-up of the airplane. It can be obtained by self-piloting of the synchronous machine with a low-power, auxiliary static converter, or by a second machine of low power.

The flywheel is kept in rotation during airplane functioning and it is therefore able, at any moment, to enter into operation since the energy needed for its maintained rotation, essentially intended to offset losses through mechanical friction, is low.

Figure 5:
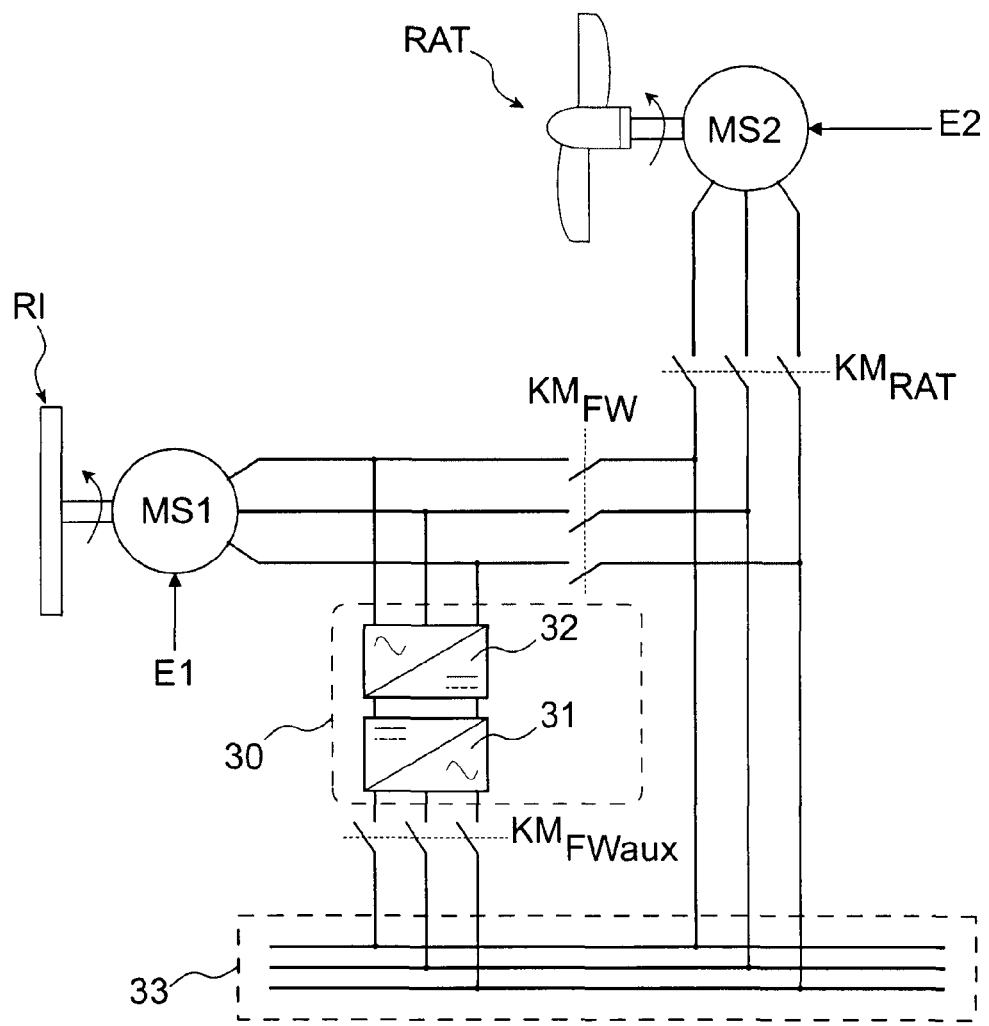
FIGS. 5, 6 and 7 illustrate an example of embodiment of the device of the invention for emergency electric power supply, and the functioning thereof.

FIG. 5 illustrates an exemplary embodiment of the device of the invention which comprises an auxiliary device 30 associated with a flywheel RI coupled to a first synchronous machine MS1 with separate excitation E1, and a ram air turbine RAT coupled to a second synchronous machine with separate excitation E2.

The first synchronous machine MS1 is connected:
to the auxiliary device 30, which itself is connected to the <<essential>> bus bar 33 via a first three-phase contactor $KM_{FWaux}$,
to this bus bar 33, via a second three-phase contactor $KM_{FW}$,
to the second synchronous machine MS2, via this second three-phase contactor $KM_{FW}$, and a third three-phase contactor $KM_{RAT}$.

The auxiliary device 30 comprises two static converters 31, 32. The first converter 31 is a three-phase rectifier via which a direct current (DC) can be obtained. This voltage is then <<inverted>> by means of the second converter 32 which is a three-phase inverter, allowing self-piloting of the first synchronous machine MS1 so as gradually to set in rotation this first synchronous machine MS1 and the flywheel RI.

The auxiliary device 30 is used permanently for as long as the <<essential>> AC bus bar 33 is supplied by the primary generators (GEN1-GEN4) or by the ram air turbine RAT, the $KM_{RAT}$ switch in this latter case being closed. This device 30 maintains the rotating speed of the flywheel RI at its nominal value. This device therefore draws power from the electrical power circuit to maintain the charge thereof. Contactor $KM_{FW}$ is then open and contactor $KM_{FWaux}$ is closed.

When the flywheel RI is coupled to the bus bar 33 to supply it with electricity, the command orders of the contactors are reversed: contactor $KM_{FW}$ is closed, and contactor $KM_{FWaux}$ is open. Power subsequently transits from the flywheel RI towards this <<essential>> AC bus bar 33. The flywheel RI loses its charge.

Figure 6:
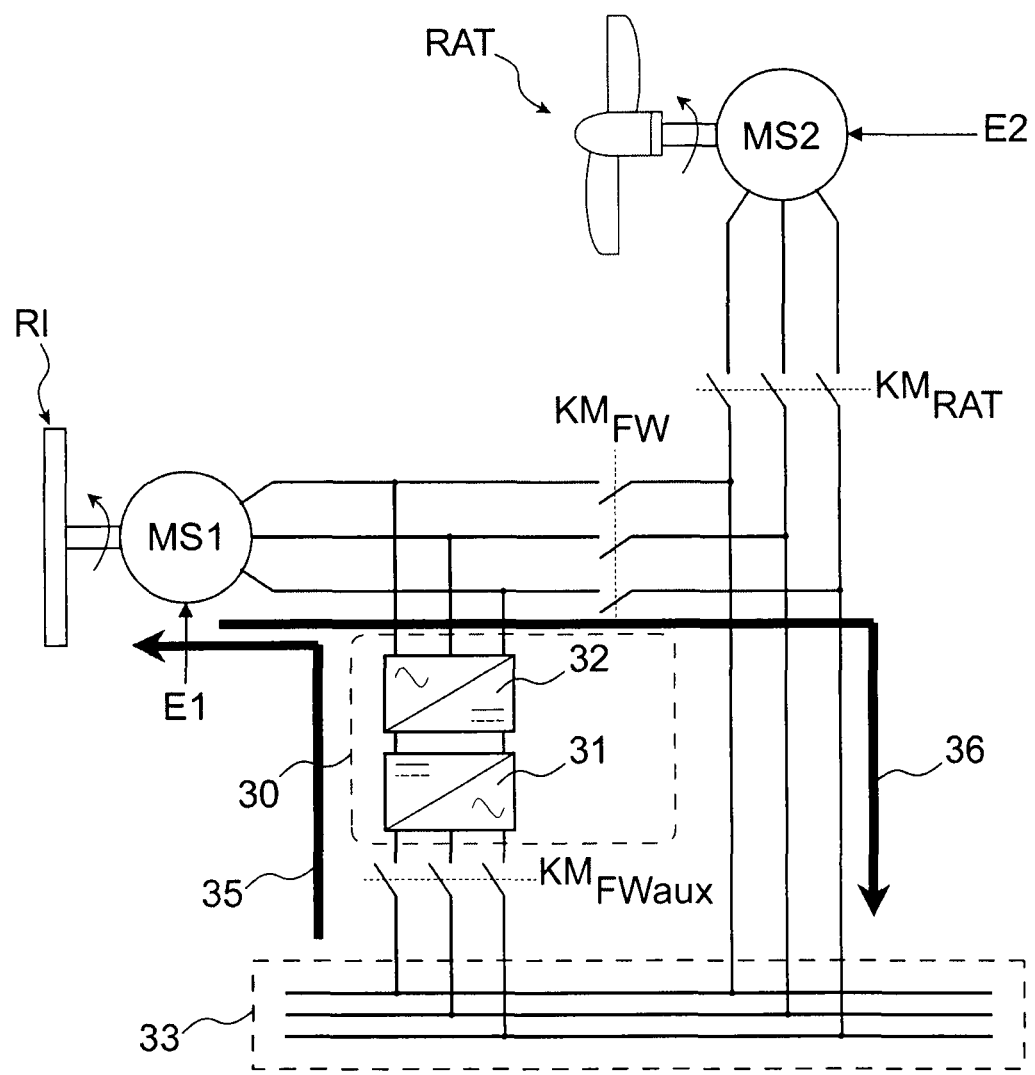

Therefore, FIG. 6, arrow 35 illustrates the only possible power pathway to charge the flywheel RI. Arrow 36 illustrates the only possible power pathway for discharge of the flywheel RI.

In the event of total failure of electricity generation, the electrical power system becomes disconnected from any electrical source. The flywheel RI is instantly coupled to the circuit (closing of contactor $KM_{FW}$), thereby allowing an adequate voltage level to be maintained, and allowing the required power and energy to be supplied for proper functioning of the airplane.

After the few seconds needed for deployment and setting in rotation of the ram air turbine RAT, the flywheel RI is uncoupled from the circuit to give way to this ram air turbine (opening of $KM_{FW}$ and closing of $KM_{RAT}$). This ram air turbine then takes over the maintaining of circuit voltages and supplying of all power and energy required for proper functioning of the airplane.

During the transitory period, the flywheel RI has discharged a substantial quantity of energy. It then needs to be recharged to ensure its availability for any future transitory period. This restoration of flywheel speed, as for its initial setting in rotation described previously, is obtained using the <<essential>> part 33 of the circuit, via the auxiliary device 30.

On landing of the aircraft, the ram air turbine RAT, which is no longer active, is uncoupled from the circuit. The flywheel RI is again coupled to the circuit to supply the power required for braking of the airplane (opening of contactor $KM_{RAT}$ and closing of contactor $KM_{FW}$).

Figure 7:
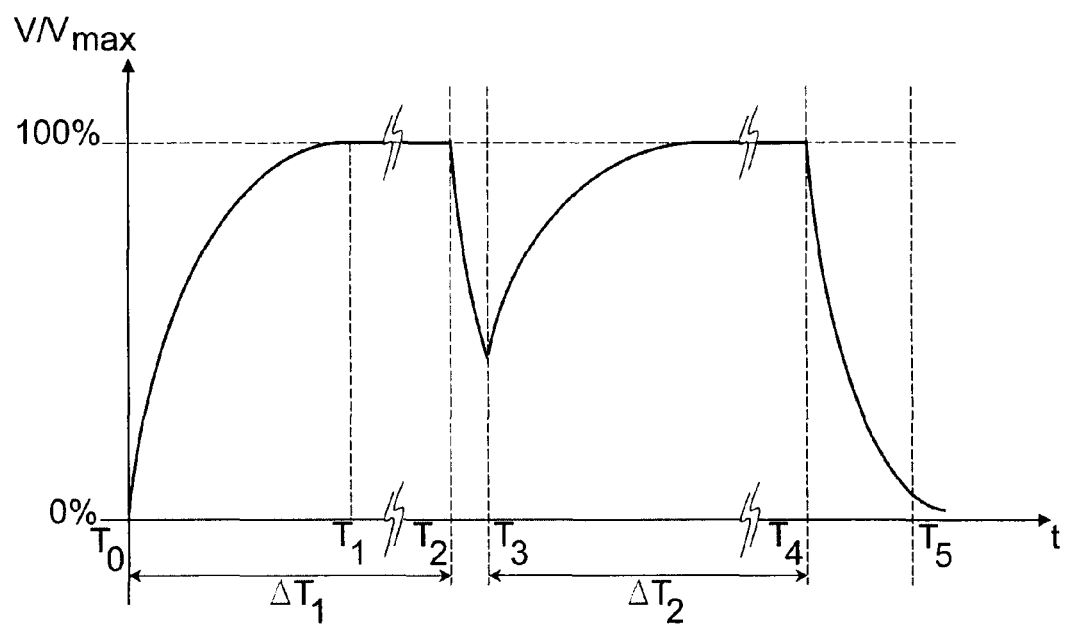

The chronogram in FIG. 7 illustrates the functioning of the flywheel RI, such as defined above, in relation to time t, the speed of rotation V of the flywheel RI representing its charge status.

This figure depicts the following times t:
T0: airplane start-up,
T1: take-off,
T2: loss of electricity generation (generators GEN1-GEN4),
T3: entry into operation of the ram air turbine RAT,
T4: landing,
ΔT1: electricity generation by generators GEN1-GEN4,
ΔT2: electricity generation by the ram air turbine RAT.

At nominal speed (V=Vmax), available energy is maximal. The chronogram shows the two transitory periods that are not covered by the ram air turbine, lying between times T2 and T3, and times T4 and T5. It can be clearly seen that initial charging of the flywheel RI occurs on start-up of the airplane (time T0), and it is then maintained during the flight. During the first transitory period (period T2→T3), the flywheel loses its charge. It is then recharged. On landing, the ram air turbine RAT becomes inactive, placing full demand on the flywheel (period T4→T5).

With regard to the powers involved, a power level of the auxiliary device 30 that is equivalent to around 10% of the power of the ram air turbine RAT, enables the flywheel RI to be charged in a time of approximately one minute. For a ram air turbine RAT having a 50 kW generator for example, an auxiliary power of 5 kW is adequate for the charging phases.

The invention claimed is:

1. A device for supplying emergency electricity to at least a part of an electrical power circuit on board an aircraft, comprising:
a first synchronous machine associated with a first excitation and a flywheel;
an auxiliary device that sets the flywheel in rotation and maintains the rotation of the flywheel; and
a second synchronous machine associated with a second excitation that is separate from the first excitation, the second synchronous machine being associated with a ram air turbine, wherein
the auxiliary device is connectable to a bus bar via a first three-phase contactor, and
the first synchronous machine is connectable:
to the auxiliary device,
to the bus bar via a second three-phase contactor, and
to the second synchronous machine via the second three-phase contactor and a third three-phase contactor.

2. The device according to claim 1, wherein the auxiliary device includes two static converters.

3. The device according to claim 2, wherein the first converter is a three-phase rectifier used to obtain direct voltage.

4. The device according to claim 2, wherein
the second converter is a three-phase inverter, and
the auxiliary device is configured to self-pilot the first synchronous machine.

5. The device according to claim 1, wherein the aircraft is an airplane.

6. The device according to claim 5, wherein the airplane is an all-electric airplane.

7. An aircraft comprising the device according to claim 1.

8. A method to provide an emergency electricity supply on board an aircraft, comprising:

supplying, by a first synchronous machine associated with a first excitation and a flywheel, emergency electricity to at least a part of an electrical power circuit in event of total failure of electricity generation;

setting, by an auxiliary device, the flywheel in rotation;

maintaining, by the auxiliary device, the rotation of the flywheel;

supplying, by a second synchronous machine associated with a second excitation that is separate from the first excitation, the second synchronous machine being associated with a ram air turbine, electricity to the electrical power circuit of the aircraft;

coupling the flywheel to the part of the electrical power circuit instantly in the event of total failure of electricity generation; and uncoupling the flywheel from the electrical power circuit after a time needed for deployment and setting in rotation of the ram air turbine, wherein the auxiliary device is connectable to a bus bar via a first three-phase contactor.

9. The method according to claim 8, further comprising a step of recharging, via the auxiliary device, the flywheel using the part of the electrical power circuit.

10. The method according to claim 8, further comprising a step of coupling the flywheel to the part of the electrical power circuit during landing of the aircraft when the ram air turbine becomes inactive to supply the necessary power for braking of the airplane.

* * * * *